(12) United States Patent
Ballenger et al.

(10) Patent No.: US 7,492,079 B2
(45) Date of Patent: Feb. 17, 2009

(54) TUNGSTEN HALOGEN LAMP HAVING INTERNAL POWER SUPPLY INCLUDING TEMPERATURE RELIEF

(75) Inventors: Matthew B. Ballenger, Lexington, KY (US); Ernest C. Weyhrauch, Cookeville, TN (US); George B. Kendrick, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 694 days.

(21) Appl. No.: 11/152,553

(22) Filed: Jun. 14, 2005

(65) Prior Publication Data

US 2005/0212437 A1    Sep. 29, 2005

(51) Int. Cl.
*H01J 1/02*    (2006.01)
(52) U.S. Cl. .................. 313/33; 313/34; 313/11; 313/17; 313/18

(58) Field of Classification Search ............... 362/631, 362/632, 172, 173, 178, 181, 182, 184, 186, 362/646, 296, 310, 363, 374, 377, 378, 362; 313/33, 11, 17, 18, 20, 27
See application file for complete search history.

(56) References Cited

U.S. PATENT DOCUMENTS

| 4,547,704 | A | | 10/1985 | Brinn | |
|---|---|---|---|---|---|
| 5,629,581 | A | * | 5/1997 | Belle et al. | 313/318.12 |
| 5,961,204 | A | * | 10/1999 | Martich et al. | 362/295 |
| 2008/0062703 | A1 | * | 3/2008 | Cao | 362/311 |

* cited by examiner

*Primary Examiner*—Tuyet Vo
(74) *Attorney, Agent, or Firm*—William E. Meyer

(57) ABSTRACT

A lamp (10) includes an envelope (12) having a body (14) with a light source capsule (16) contained therein and ending in a hollow base (18) that terminates in a conical end (20). A circuit board (22) is positioned within the hollow base (18) and includes a triangular portion (24) that is closely fitted within the conical end (20). A temperature sensitive, voltage reducing component (28a) is positioned near the apex (30) of the triangular portion (24).

4 Claims, 3 Drawing Sheets

| 50 Watt | Temperature (°C) |
|---|---|
| Point 1 | 92.8 |
| Point 2 | 111.8 |
| Point 3 | 76.6 |
| Point 4 | 55.8 |
| Point 5 | 53.5 |
| Point 6 | 54.8 |
| Point 7 | 28.4 |
| Point 8 | 24.6 |

*Fig. 2*

| 75 Watt | Temperature (°C) |
|---|---|
| Point 1 | 100.1 |
| Point 2 | 135.7 |
| Point 3 | 86.6 |
| Point 4 | 64.5 |
| Point 5 | 58.6 |
| Point 6 | 55.6 |
| Point 7 | 33.3 |
| Point 8 | 24.6 |

*Fig. 3*

TUNGSTEN HALOGEN LAMP HAVING INTERNAL POWER SUPPLY INCLUDING TEMPERATURE RELIEF

TECHNICAL FIELD

This invention relates to electric lamps and more particularly to electric lamps employing internal circuitry such as an integral voltage-reducing device.

BACKGROUND ART

Various methods exist for reducing the voltage to electric lamps for purposes of extending the life times of the lamps. It also has been proposed that the voltage reducing circuitry necessary to accomplish this function be incorporated directly into the lamp, for example, in the lamp base. The procedure is often used with encapsulated halogen lamps, particularly in reflectorized PAR lamps. Such circuitry is shown and described, for example, in pending U.S. patent applications Ser. Nos. 11/051,678; 11/050,950; and 11/051,840, all of which were filed on Feb. 04, 2005 and are assigned to the assignee of the present invention, and in U.S. Pat. No. 4,547,704. In all of the above-cited examples the circuitry and necessary components are mounted upon a rectangular printed circuit board that is contained within the base of the lamp. These components are subjected to various temperature levels during operation of the lamp and, since most of the components are limited to a maximum operating temperature of 120° C., this limiting factor has compromised the lamp operation.

DISCLOSURE OF INVENTION

It is, therefore, an object of the invention to obviate the disadvantages of the prior art.

It is another object of the invention to enhance the operation of lamps generally.

It is yet another object of the invention to enhance the operation of lamps employing heat-sensitive circuitry.

Yet another object of the invention is to enhance the operation and life of halogen lamps employing voltage-reducing circuitry.

These objects are accomplished, in one aspect of the invention, by providing a lamp having an envelope having a body with a light source capsule contained therein and ending in a hollow base terminating in a conical end, the improvement wherein a circuit board positioned within the base includes a triangular portion closely fitted within said conical end.

In a preferred embodiment of the invention a circuit component having less heat resistance than other components is positioned on an area of the board that is subject to less heat than other areas of the board.

This procedure increases the life of the component and thus the life of the lamp.

BRIEF DESCRIPTION OF THE DRAWINGS

FIG. 2 is table showing the temperatures at the points illustrated in FIG. 1 for a 50 watt lamp;

FIG. 3 is a similar table showing the temperatures for a 75 watt lamp; and

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
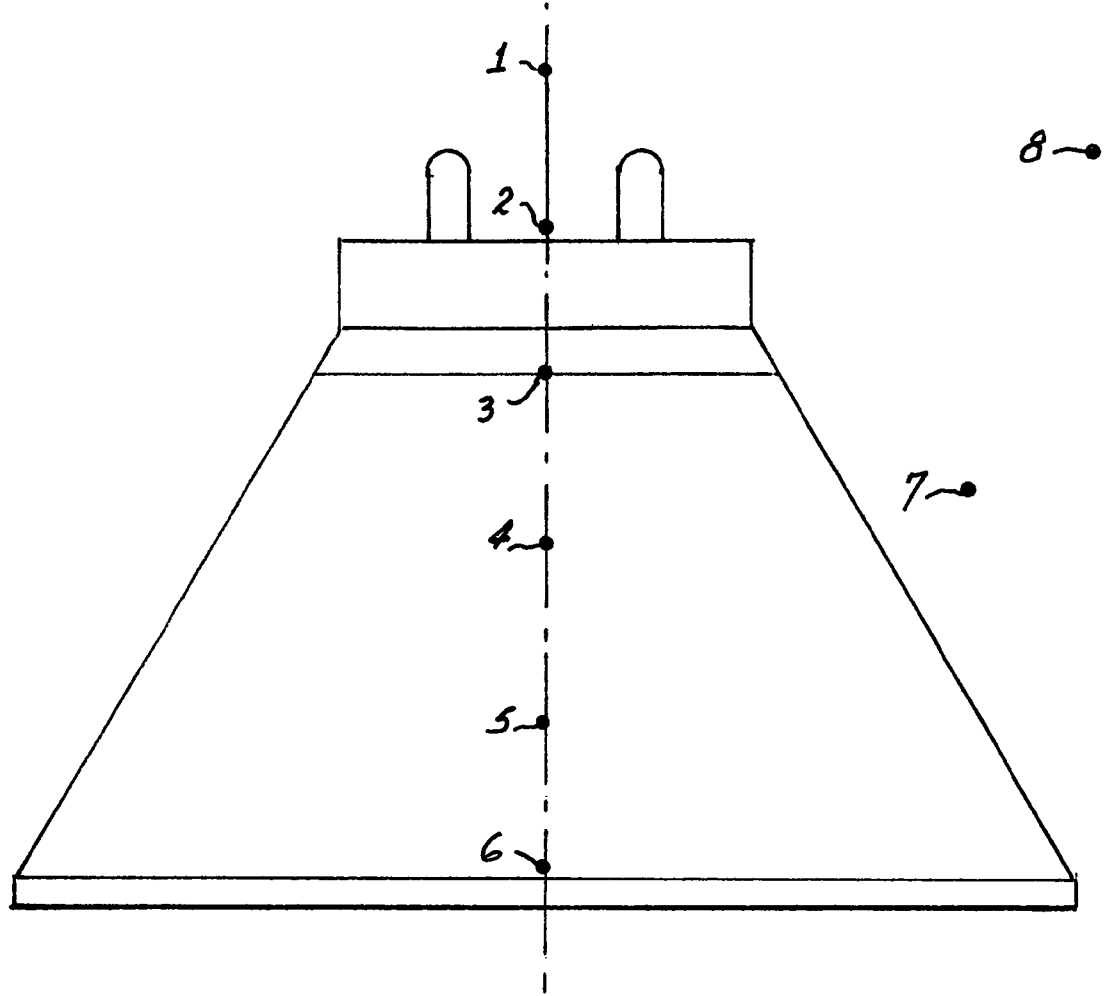
FIG. 1 is an elevational view of a PAR 38 lamp reflector, minus the base, with indicated temperature points.

Referring now to the drawings with greater particularity, there is shown in FIG. 1 a diagrammatic representation of a PAR 38 lamp envelope with the base removed and with various temperature points illustrated by the numbers 1-8. Points 2-6 are at the glass surface, Point 1 is approximately 32 mm above the reflector, Point 7 is approximately 12 mm from the reflector and Point 8 represents the ambient temperature. The temperature measurements for Points 1 and 2 were made with the lamp base in place. The actual temperatures for a 50 Watt lamp and a 75 Watt lamp are shown respectively in FIGS. 2 and 3.

Figure 4:
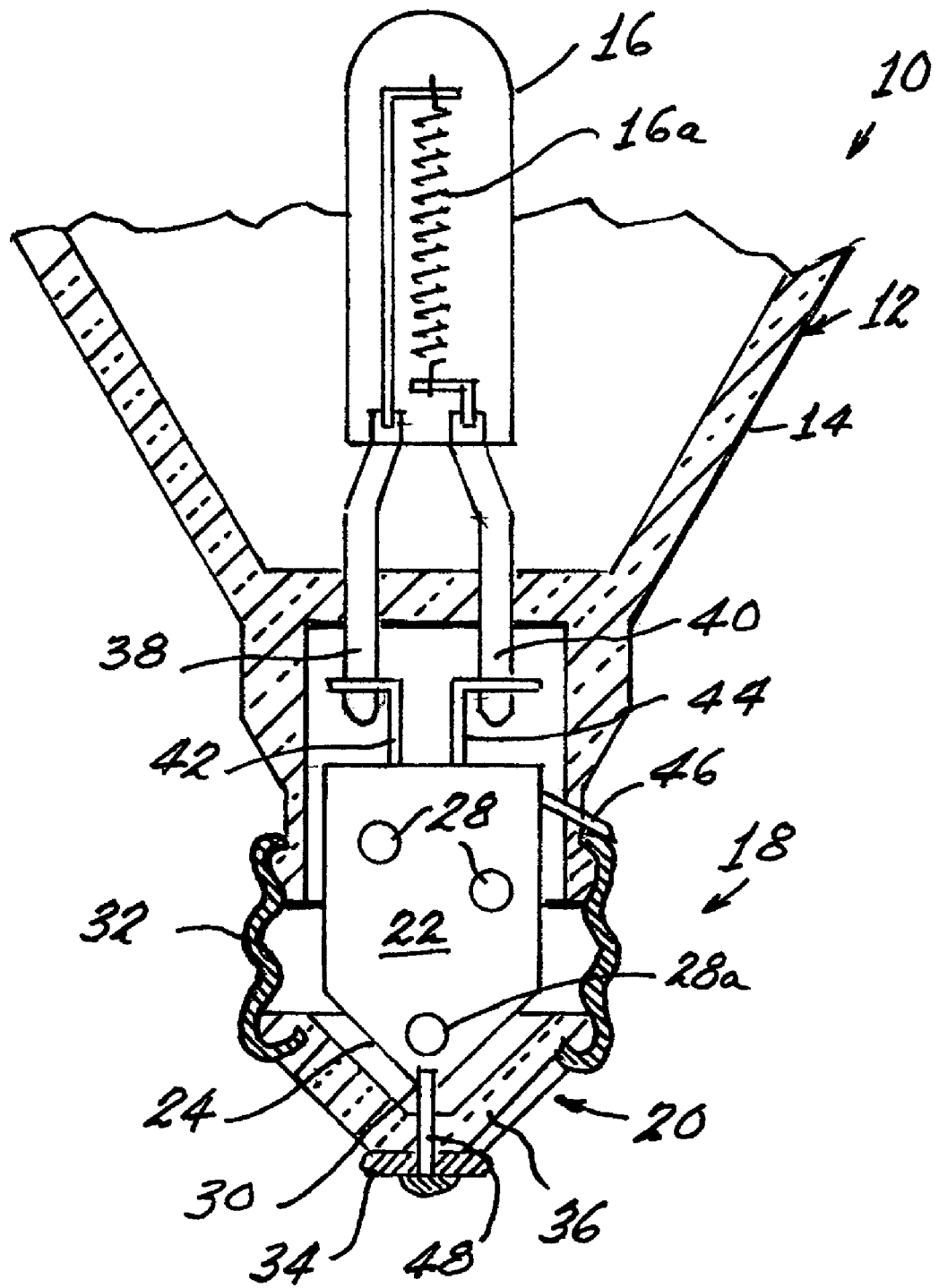
FIG. 4 is an elevational, sectional view of an embodiment of the invention.

Referring now to FIG. 4, there is shown a lamp 10 including an envelope 12 having a body 14 with a light source capsule 16 contained therein and ending in a hollow base 18 that terminates in a conical end 20. A circuit board 22 is positioned within the hollow base 18 and includes a triangular portion 24 that is closely fitted within the conical end 20.

As noted above the lamp 10 exhibits a range of temperatures along a vertical axis 26 and the circuit board 22 includes temperature-sensitive, voltage reducing components 28 mounted thereon. One of the temperature sensitive, voltage reducing components, for example, 28a, is more sensitive to temperature than others of the components 28 and the more sensitive component 28a is positioned near the apex 30 of the triangular portion 24, which, is the section furthest from the high temperature recorded at Point 2.

The hollow base 18 of the lamp 10 comprises an electrically conductive shell 32 and an electrically conductive eyelet 34 separated by an electrical insulator 36. This base is commonly known as an Edison base; however, any other base configuration, such as the known bayonet type, can also be employed.

The lamp 10 includes a light source capsule 16, such as a tungsten halogen capsule containing a filament 16a, with the capsule 16 being mounted in the body 14 by lead-ins 38, 40 having a given diameter. The lead-ins 38, 40 are fairly substantial as they also provide mechanical support for the capsule 16; however they are electrically connected to the circuit board 22 by wires 42, 44 having a diameter less than the given diameter, thereby further reducing the amount of heat conducted to the circuit board 22.

To still further reduce the amount of heat directed to the heat sensitive component 28a the electrically conductive shell 32 and the electrically conductive eyelet 34 are operatively connected to the circuit board 22 by wires 46, 48, which also have a diameter less than the given diameter. Attachment of the wires 42, 44, 46 and 48 to the board 22 is preferably by soldering and to lead-ins 38, 40 and the shell 32 and eyelet 34 by welding; however, other techniques can be utilized as necessary or desired.

Thus there is provided a lamp containing an integral voltage-reducing power supply within its base, all of the power supply components being mounted on a single printed circuit board with a pointed end. The pointed end allows the board to be inserted farther into the base and permits the most heat sensitive components to be positioned as far away as possible from the greatest heat source. The pointed end of the board functions also as a "lead in" for the base and aids in the assembly process.

While there have been shown and described what are present considered to be the preferred embodiments of the invention, it will be apparent to those skilled in the art that various changes and modifications can be made herein without departing from the scope of the invention as defined by the appended claims.

What is claimed is:

1. In a lamp including an envelope having a body with a light source capsule contained therein and ending in a hollow base terminating in a conical end, said lamp being subject to temperature variation along a vertical axis, the improvement wherein a circuit board positioned within said base includes a triangular portion closely fitted within said conical end, said circuit board including temperature-sensitive, voltage reducing components mounted thereon, one of said temperature sensitive, voltage reducing components being more sensitive to temperature than others of said components and said more sensitive component being positioned near the apex of said triangular portion.

2. The lamp of claim 1 wherein said hollow base comprises an electrically conductive shell and an electrically conductive eyelet separated by an electrical insulator.

3. The lamp of claim 2 wherein said light source capsule is mounted in said body by lead-ins having a given diameter and said lead-ins are electrically connected to said circuit board by wires having a diameter less than said given diameter.

4. The lamp of claim 3 wherein said electrically conductive shell and said electrically conductive eyelet are operatively connected to said circuit board by wires having a diameter less than said given diameter.

* * * * *